United States Patent
Lin et al.

(10) Patent No.: US 11,197,359 B1
(45) Date of Patent: Dec. 7, 2021

(54) BACKLIGHT MODULE AND DISPLAY APPARATUS

(71) Applicant: HIMAX TECHNOLOGIES LIMITED, Tainan (TW)

(72) Inventors: Chih-Ying Lin, Tainan (TW); Yung-Lin Chang, Tainan (TW); Ching-Lun Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/928,021

(22) Filed: Jul. 14, 2020

(51) Int. Cl.
  *H05B 45/46* (2020.01)
  *G02F 1/13357* (2006.01)
  *H05B 45/48* (2020.01)
  *G02F 1/1335* (2006.01)

(52) U.S. Cl.
  CPC ....... *H05B 45/46* (2020.01); *G02F 1/133603* (2013.01); *H05B 45/48* (2020.01); *G02F 1/133601* (2021.01); *G02F 1/133612* (2021.01)

(58) Field of Classification Search
  None
  See application file for complete search history.

(56) References Cited

U.S. PATENT DOCUMENTS

| | | | | |
|---|---|---|---|---|
| 8,207,933 B2* | 6/2012 | Shin | ............... | G09G 3/3413 345/102 |
| 2009/0015172 A1* | 1/2009 | Huang | ............... | H05B 31/50 315/246 |
| 2011/0121741 A1* | 5/2011 | Yamamoto | ........ | G09G 3/3406 315/193 |
| 2011/0199011 A1* | 8/2011 | Nakazawa | ........ | G09G 3/342 315/193 |
| 2011/0227503 A1* | 9/2011 | Yuan | ............... | H05B 45/46 315/294 |
| 2012/0253542 A1* | 10/2012 | Nurmi | ............... | H05B 45/18 700/299 |

* cited by examiner

*Primary Examiner* — Crystal L Hammond
(74) *Attorney, Agent, or Firm* — CKC & Partners Co., LLC (57) ABSTRACT

A backlight module is disclosed, which includes light emitting units arranged in columns. Each light emitting unit includes a light emitter and a first switch in parallel connection. The first switch is configured to selectively bypass the light emitter. In the backlight module, the light emitters in the same column of light emitting units are in serial connection.

16 Claims, 9 Drawing Sheets

BACKLIGHT MODULE AND DISPLAY APPARATUS

BACKGROUND

Field of the Invention

The invention relates to local dimming, and more particularly to a backlight module and a display apparatus with a local dimming function.

Description of Related Art

A conventional liquid crystal display (LCD) device normally includes a backlight module for providing a backlight source in order to display images. Furthermore, a local dimming technology may be applied to the backlight module to increase the contrast of the LCD device, in which the backlight brightness of specific parts are determined according to the gray level distribution of an image to be displayed. In some examples, for displaying a high gray level portion of an image, the corresponding part of the backlight module will output light with relatively high brightness; for displaying a low gray level portion of an image, the corresponding part of the backlight module will output light with relatively low brightness. However, for the backlight module with small size and large number of parts for local dimming, the number of high-voltage current paths in the backlight module increases, resulting in significant power consumption.

SUMMARY

One aspect of the invention directs to a backlight module. The backlight module includes light emitting units that are arranged in columns. Each light emitting unit includes a light emitter and a first switch in parallel connection with each other. For each light emitting unit, the first switch is configured to selectively bypass the light emitter. The light emitters in the same column of light emitting units are in serial connection.

In accordance with one or more embodiments of the invention, each light emitting unit further includes a voltage drop component that is in serial connection with the first switch of the same light emitting unit.

In accordance with one or more embodiments of the invention, the voltage drop component of each light emitting unit is a resistor.

In accordance with one or more embodiments of the invention, the light emitter of each light emitting unit is at least one light emitting diode (LED).

In accordance with one or more embodiments of the invention, the backlight module further includes a control circuit that is electrically connected to the first switches of the light emitting units and is configured to control statuses of the first switches.

In accordance with one or more embodiments of the invention, the control circuit is a microcontroller.

In accordance with one or more embodiments of the invention, the backlight module further includes voltage dividers that are respectively connected to the columns of light emitting units and are configured to divide power supply voltage for the light emitters depending on the statuses of the first switches.

In accordance with one or more embodiments of the invention, each voltage divider receives the power supply voltage and includes voltage drop components and second switches. The second switches are respectively in parallel connection with the voltage drop components, and are configured to selectively bypass the voltage drop components.

In accordance with one or more embodiments of the invention, the voltage drop components of each voltage divider are resistors.

In accordance with one or more embodiments of the invention, the control circuit is electrically connected to the second switches of the voltage dividers, and is configured to control statuses of the second switches of the voltage dividers.

Another aspect of the invention is directed to a display apparatus. The display apparatus includes a display panel and a backlight module. The display panel is configured to display an image based on image data. The backlight module is configured to provide backlight for the display panel to display the image. The backlight module includes light emitting units that are arranged in columns. Each light emitting unit includes a light emitter and a first switch in parallel connection with each other. For each light emitting unit, the first switch is configured to selectively bypass the light emitter. The light emitters in the same column of light emitting units are in serial connection.

In accordance with one or more embodiments of the invention, the display apparatus includes a local dimming control circuit and a backlight control circuit. The local dimming control circuit is configured to generate local dimming data based on the image data and the arrangement of the light emitting units. The backlight control circuit is configured to generate switching signals respectively for the first switches of the light emitting units based on the local dimming data.

In accordance with one or more embodiments of the invention, the local dimming control circuit and the backlight control circuit are integrated in a single integrated chip.

In accordance with one or more embodiments of the invention, the backlight control circuit is a microcontroller.

In accordance with one or more embodiments of the invention, the display apparatus further includes voltage dividers that are respectively connected to the columns of light emitting units and are configured to divide power supply voltage for the light emitters depending on the statuses of the first switches.

In accordance with one or more embodiments of the invention, each voltage divider receives the power supply voltage and includes voltage drop components and second switches. The second switches are respectively in parallel connection with the voltage drop components, and are configured to selectively bypass the voltage drop components.

In accordance with one or more embodiments of the invention, the voltage drop components of each voltage divider are resistors.

In accordance with one or more embodiments of the invention, the backlight control circuit is electrically connected to the second switches of the voltage dividers and is configured to control statuses of the second switches.

In accordance with one or more embodiments of the invention, each light emitting unit further includes a voltage drop component that is in serial connection with the first switch of the same light emitting unit.

In accordance with one or more embodiments of the invention, the voltage drop component of each light emitting unit is a resistor.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

FIG. 5A exemplarily shows an image to be displayed by the LCD panel in

FIG. 1.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

The document may repeat reference numerals and/or letters in the various examples. This repetition is for the purpose of simplicity and clarity and does not in itself dictate a relationship between the various embodiments and/or configurations discussed.

Figure 1:
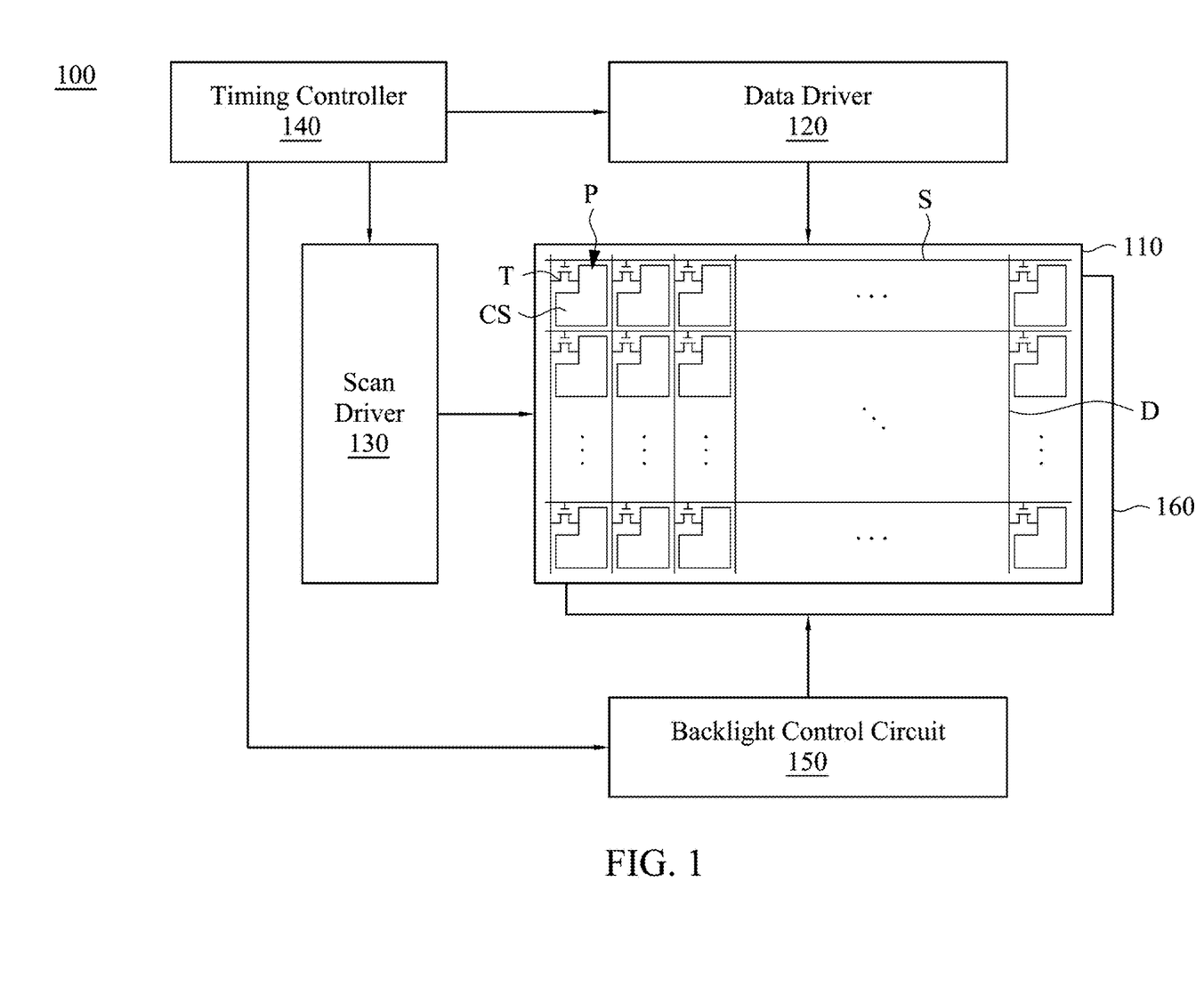
FIG. 1 is a schematic diagram of a display apparatus in accordance with one or more embodiments of the invention.

FIG. 1 is a schematic diagram of a display apparatus 100 according to one or more embodiments of the invention. The display apparatus 100 includes a liquid crystal display (LCD) panel 110, a data driver 120, a scan driver 130, a timing controller 140, a backlight control circuit 150 and a backlight module 160. The LCD panel 110 may be, for example, in a twisted nematic (TN) mode, in-plane switching (IPS) mode or any other suitable mode. In addition, the LCD panel 110 includes a plurality of pixel units P, a plurality of data lines D, and a plurality of scanning lines S. In the LCD panel 110, the pixel units P form a matrix of rows and columns. Each pixel unit P includes a switch element T that is driven by a data line D and a scan line S to be turned on for a specific time interval, such that the storage capacitor CS is charged for displaying the corresponding gray level. The data driver 120 is configured to generate data driving signals to respectively drive the data lines D to transmit gray level data to the columns of pixel units P. The scan driver 130 is configured to generate scan driving signals to drive the scan lines S to control the switching status of the switch elements T of the pixel units P. For each pixel unit, the switching status of the switch element T is turned on during a certain time period, so that the pixel unit P displays the corresponding gray level. Using the principle of visual persistence, the human eye can see the complete image in the display area of the LCD panel 110. The timing controller 140 is configured to control the scan driver 130 to sequentially drive the scan lines S of the liquid crystal display panel 110, and to control the data driver 120 to sequentially send the corresponding image data to the LCD panel 110 when the scan lines S are sequentially driven.

The timing controller 140 is also configured to direct the backlight control circuit 150 to control the backlight module 160. The backlight control circuit 150 may be implemented as a microcontroller. The backlight module 160 is arranged in back of the LCD panel 110 for providing light source to the LCD panel 110. The backlight module 160 may be a direct type backlight module in which light source is arranged at the back side thereof and no light guide plate is needed.

In some embodiments, the data driver 120, the scan driver 130 and the timing controller 140 are integrated into a single integrated chip. Furthermore, in certain embodiments, the chip integrating the functions of the data driver 120, the scan driver 130 and the timing controller 140 may also provide touch detection function for the LCD panel 110 with an in-cell touch sensor structure or a touch panel disposed over the LCD panel 110.

Figure 2:
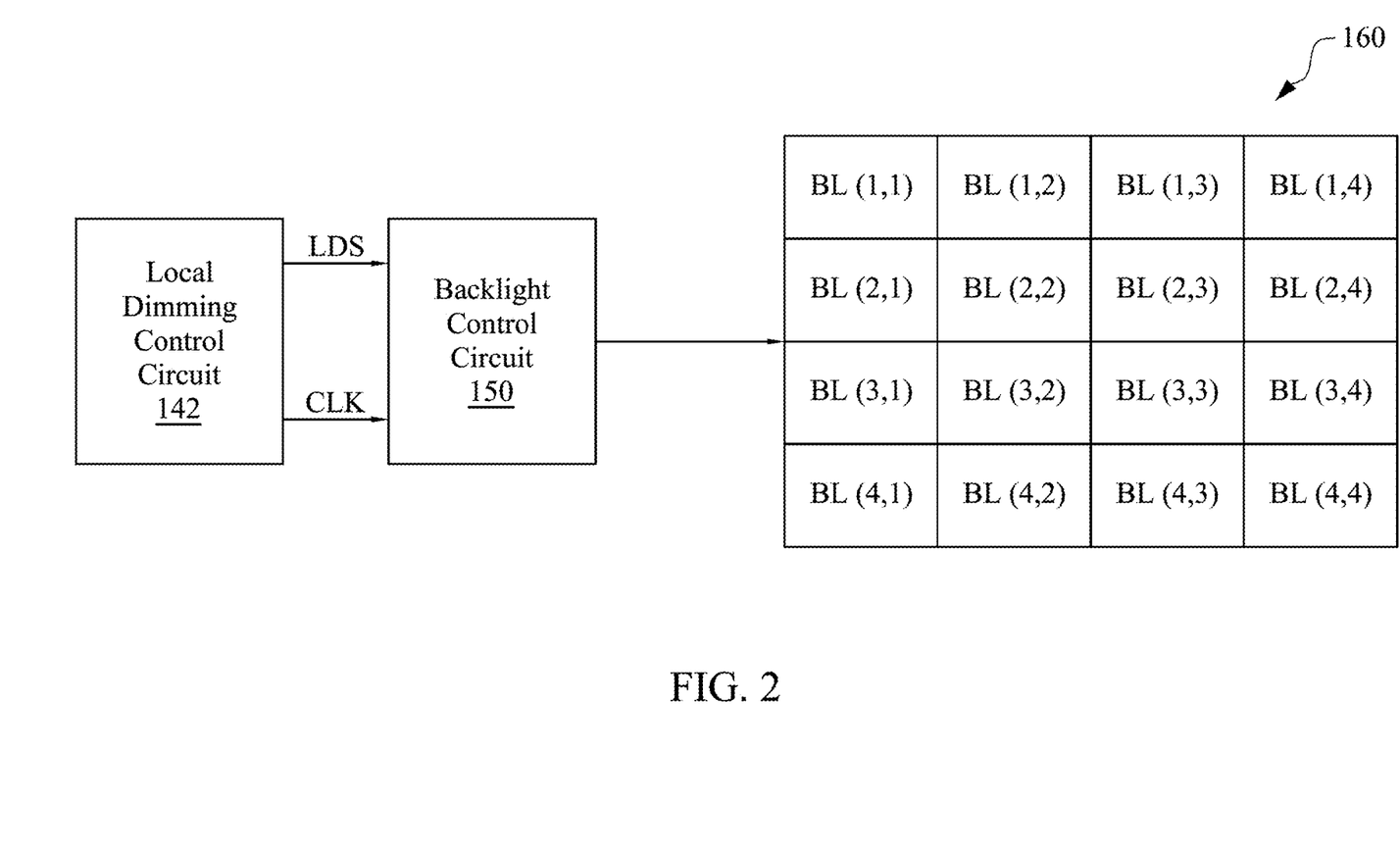
FIG. 2 exemplarily illustrates the backlight control circuit and the backlight module in FIG. 1 in addition to a local dimming control circuit in accordance with one or more embodiments of the invention.

FIG. 2 exemplarily illustrates control of the backlight control circuit 150 and the backlight module 160 in addition to a local dimming control circuit 142 in accordance with one or more embodiments of the invention. In the example of FIG. 2, the backlight module 160 is divided into 4×4 light emitting units BL(1,1)-BL(4,4), i.e., 4 rows and 4 columns of light emitting units BL(1,1)-BL(4,4). The backlight control circuit 150 is configured to provide local dimming data respectively for the light emitting units BL(1,1)-BL(4,4) to irradiate light according to the local dimming data signal LDS and the reference clock signal CLK from the local dimming control circuit 142. The local dimming data signal LDS includes the local dimming data that are generated by the local dimming control circuit 142 based on the image data to be displayed by the LCD panel 110 and the arrangement of the light emitting units BL(1,1)-BL(4,4). The local dimming data in the local dimming data signal LDS represent brightness respectively of the light emitting units BL(1,1)-BL(4,4). Each bit in the local dimming data signal LDS may correspond to a clock period of the reference clock signal CLK, such that the backlight control circuit 150 extracts the local dimming data from the local dimming data signal LDS.

The local dimming control circuit 142 may be a circuit embedded in the timing controller 140 or externally connected with the timing controller 140. Particularly, the local dimming control circuit 142 and the backlight control circuit 150 may be integrated into a single integrated chip for some embodiments.

Figure 3:
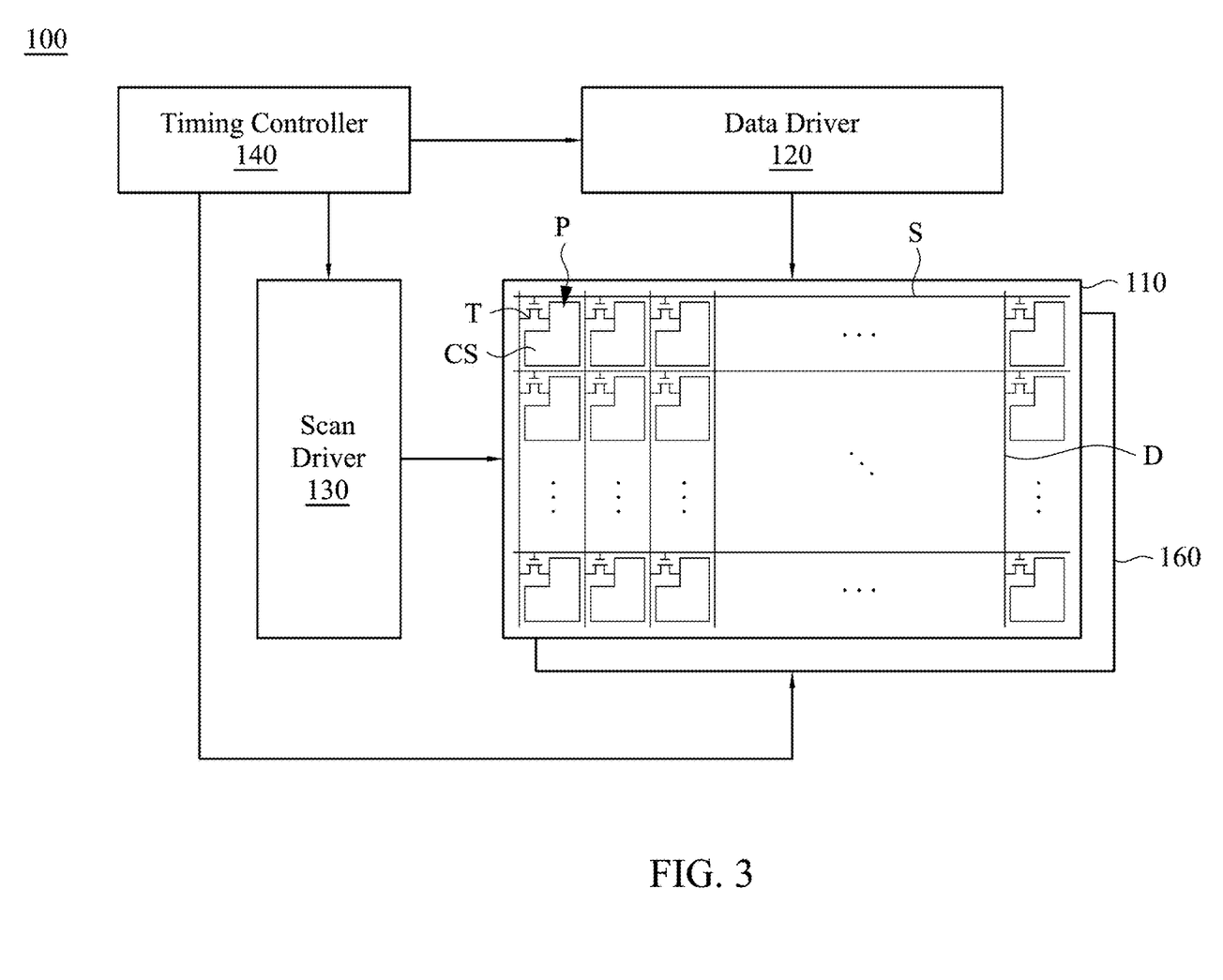
FIG. 3 exemplarily shows a modification of the schematic diagram of the display apparatus in FIG. 1.

FIG. 3 exemplarily shows a modification of the schematic diagram of the display apparatus 100. In comparison to the display apparatus 100 shown in FIG. 1, in FIG. 3, the timing controller 140 is electrically connected to the backlight module 160 for controlling the backlight module 160 to emit light with desired patterns, illuminances, frequencies, and/or the like. The timing controller 140 in FIG. 3 may have the functions of the timing controller 140 and the backlight control circuit 150 in FIG. 3. In other words, the timing controller 140 and the backlight control circuit 150 may be integrated into a single integrated circuit.

Figure 4:
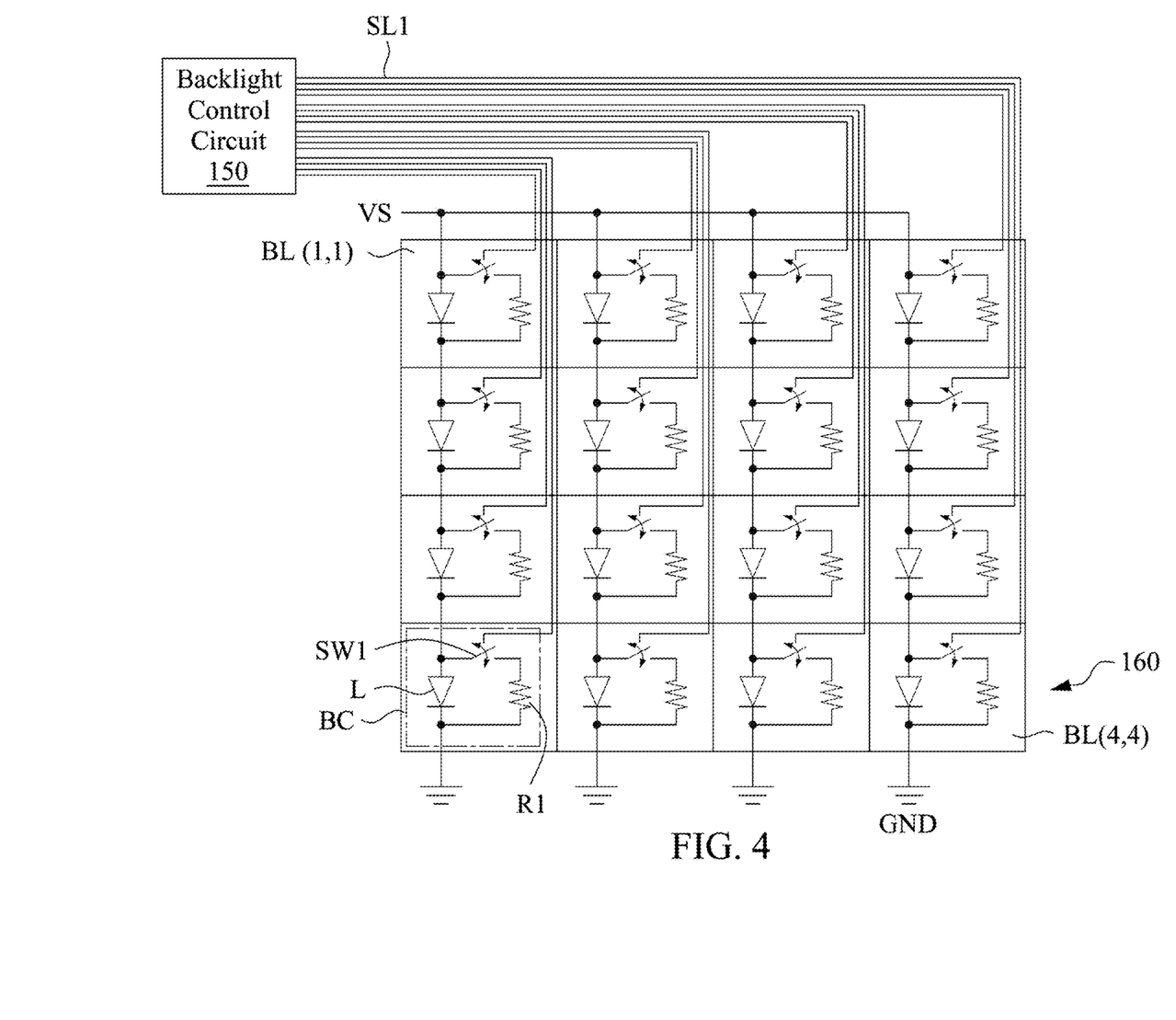
FIG. 4 is a schematic diagram of the backlight control circuit and the backlight module in FIG. 1 in accordance with one or more exemplary embodiments of the invention.

FIG. 4 is a schematic diagram of the backlight control circuit 150 and the backlight module 160 in FIG. 1 in accordance with one or more exemplary embodiments of the invention. As shown in FIG. 4, each of the light emitting units BL(1,1)-BL(4,4) has a backlight circuit BC that includes a light emitter L, a switch SW1 and a voltage drop component R1. For each of the light emitting units BL(1,1)-BL(4,4), the switch SW1 is in serial connection with the resistor R1, and the light emitter L is in parallel connection with the combination of the switch SW1 and the voltage drop component R1. The switch SW1 is configured to selectively bypass the light emitter L for light emission or not. In particular, the light emitter L emits light or not depending on the status of the switch SW1 controlled by the backlight control circuit 150. If the switch SW1 is turned off, the current flow is through the light emitter L, and thus the light emitter L emits light. Oppositely, if the switch SW1 is turned on, the current flow is through the switch SW1 instead of the light emitter L, and thus the light emitter L does not emit light.

The light emitters L in the same column of the light emitting units BL(1,1)-BL(4,4) are connected in series. The voltage source for providing the power supply voltage VS is coupled to the backlight circuits BC of the first row of light emitting units BL(1,1)-BL(1,4), and the ground GND is coupled to the backlight circuits BC of the last row of light emitting units BL(4,1)-BL(4,4). The backlight control circuit 150 may be electrically connected to the switches SW1 of the light emitting units BL(1,1)-BL(4,4) respectively through the signal lines SL1.

In various embodiments, the light emitter L may be a light emitting diode (LED), a lamp or another component capable of emitting light, the switch SW1 may be a transistor, a thyristor or another suitable component, and the voltage drop component R1 may be a resistor, a diode or another suitable component. In certain embodiments, the number of light emitters in each light emitting unit may be more than 1.

Figure 5A:
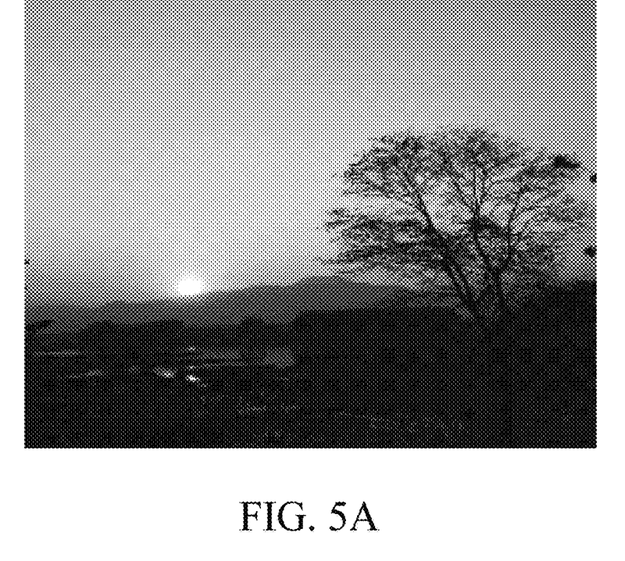
Figure 5B:
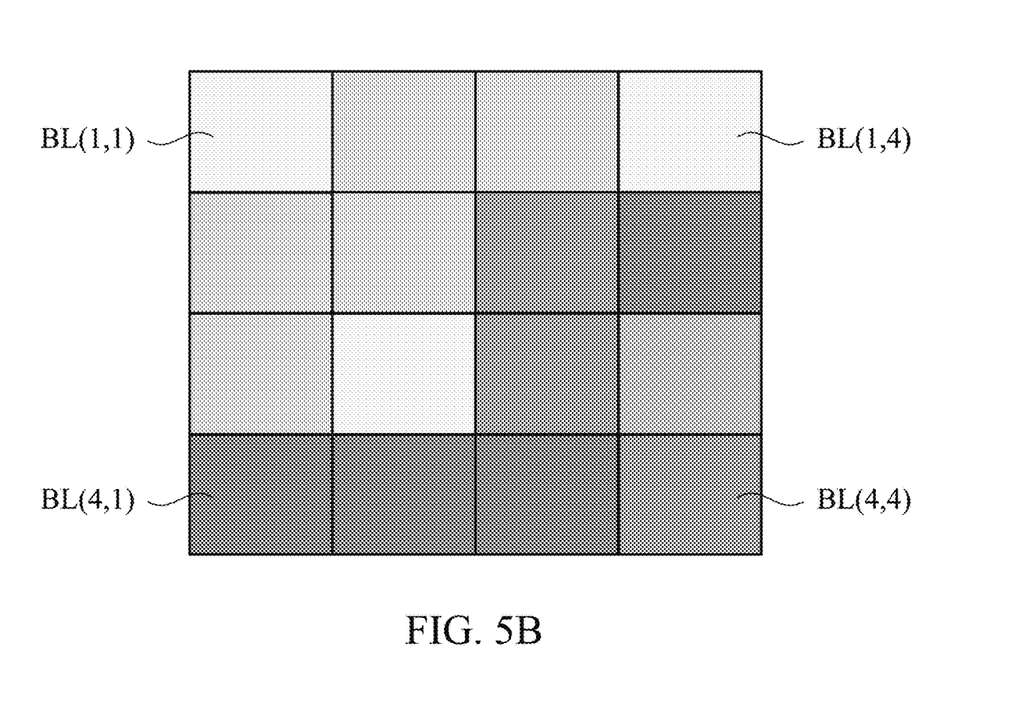
FIG. 5B shows average gray levels of portions of the LCD panel in FIG. 1 corresponding to the image shown in FIG. 5A.

FIG. 5A exemplarily shows an image to be displayed by the LCD panel 110, and FIG. 5B shows average gray levels of portions of the LCD panel 110 corresponding to the image shown in FIG. 5A. The display area of the LCD panel 110 is divided into several portions respectively corresponding to the light emitting units BL(1,1)-BL(4,4) of the backlight module 160. In particular, the local dimming control circuit 142 may convert the sub-images of the image respectively corresponding to the light emitting units BL(1,1)-BL(4,4) into averaged gray levels, and then converts these gray levels into local dimming data respectively for the light emitting units BL(1,1)-BL(4,4). As shown in FIGS. 5A-5B, the relatively bright portions of the LCD panel 110 respectively corresponding to relatively bright sub-images have high gray levels, while the relatively dark portions of the LCD panel 110 respectively corresponding to relatively dark sub-images have low gray levels.

Figure 6:
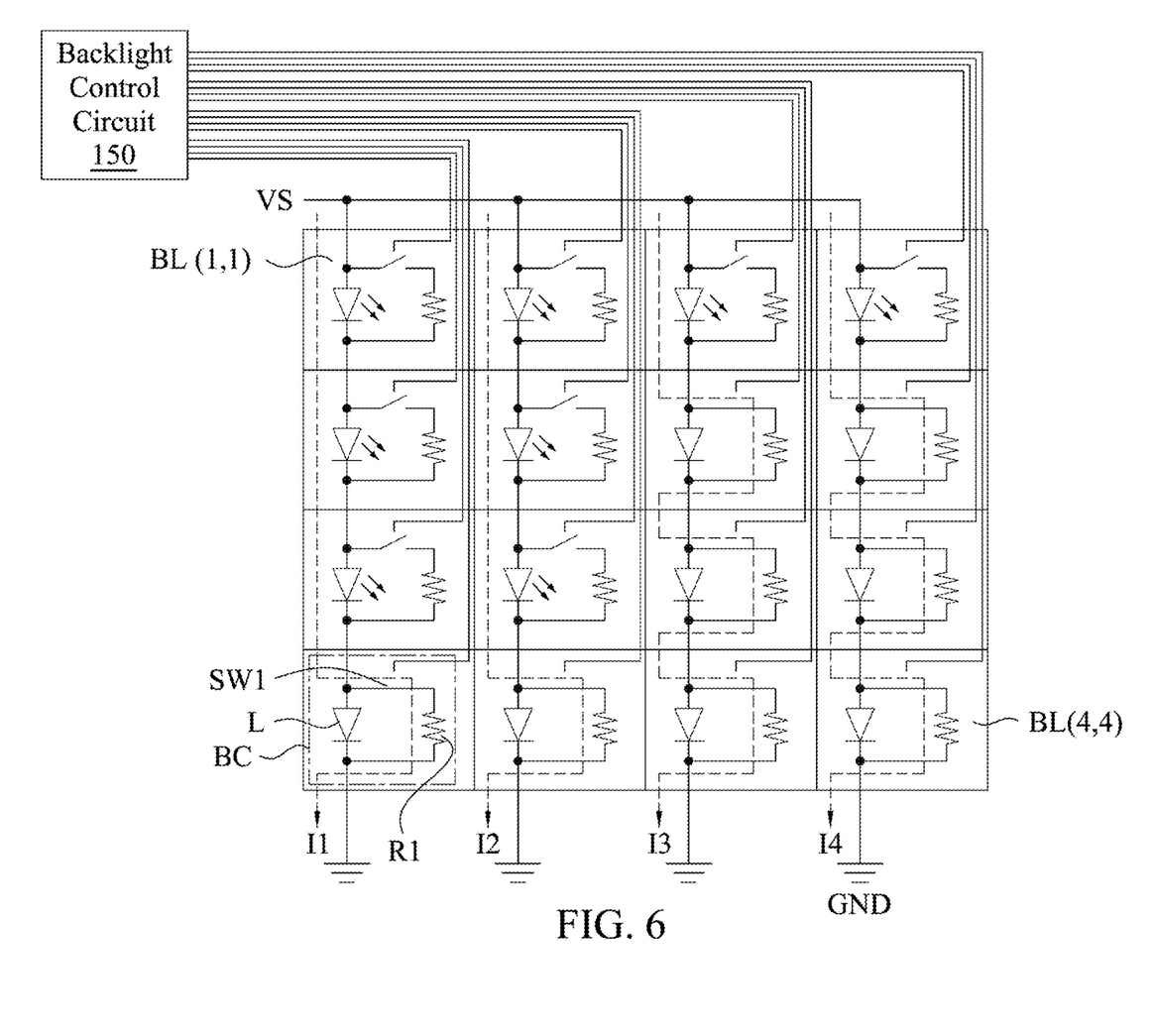
FIG. 6 exemplarily illustrates control of the switches of the light emitting units for the image shown in FIG. 5A.

The backlight control circuit 150 controls the status the switch SW1 of each of the light emitting units BL(1,1)-BL(4,4) based on the local dimming data. FIG. 6 exemplarily illustrates control of the switches SW1 of the light emitting units BL(1,1)-BL(4,4) for the image shown in FIG. 5A. In particular, the backlight control circuit 150 transmits signals to turn on the light emitters L of the light emitting units of the backlight module 160 respectively corresponding to relatively bright portions of the image displayed by the LCD panel 110 and turn off the light emitters L of the light emitting units of the backlight module 160 respectively corresponding to relatively dark portions of the image displayed the LCD panel 110. As shown in FIGS. 5B-6, the portions of the image respectively corresponding to the light emitting units BL(1,1)-BL(1,4), BL(2,1)-BL(2,2) and BL(3,1)-BL(3,2) are relatively bright portions, and thus the switches SW1 of the light emitting units BL(1,1)-BL(1,4), BL(2,1)-BL(2,2) and BL(3,1)-BL(3,2) are turned off, such that the light emitter L of each of the light emitting units BL(1,1)-BL(1,4), BL(2,1)-BL(2,2) and BL(3,1)-BL(3,2) emits light; the portions of the image respectively corresponding to the light emitting units BL(2,3)-BL(2,4), BL(3,3)-BL(3,4) and BL(4,1)-BL(4,4) are relatively dark portions, and thus the switches SW1 of the light emitting units BL(2,3)-BL(2,4), BL(3,3)-BL(3,4) and BL(4,1)-BL(4,4) are turned on, such that the light emitter L of each of the light emitting units BL(2,3)-BL(2,4), BL(3,3)-BL(3,4) and BL(4,1)-BL(4,4) does not emit light. In the first column of light emitting units BL(1,1)-BL(4,4), the current I1 flows through the light emitters L of the light emitting units BL(1,1), BL(2,1) and BL(3,1) and the switch SW1 and the voltage drop component R1 of the light emitting unit BL(4,1). The flow directions of the currents I2-I4 respectively corresponding to the second to fourth columns of light emitting units BL(1,1)-BL(4,4) are also depicted in FIG. 6.

Figure 7:
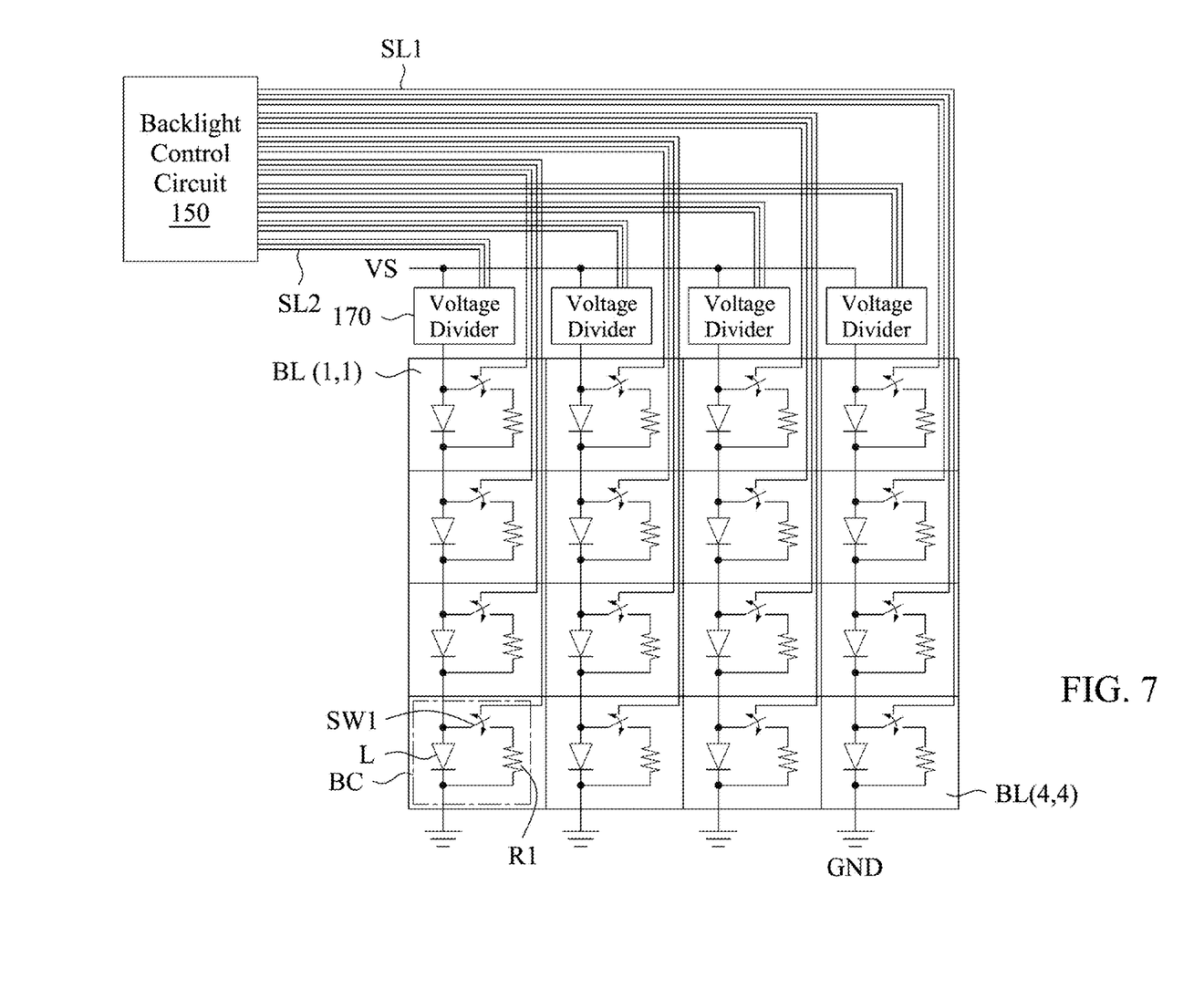
FIG. 7 is a schematic diagram of the backlight control circuit and the backlight module in FIG. 1 and further voltage dividers in accordance with one or more exemplary embodiments of the invention.

The display apparatus 100 may further include voltage dividers for dividing the power supply voltage VS provided by the voltage source. FIG. 7 is a schematic diagram of the backlight control circuit 150 and the backlight module 160 in FIG. 1 and further voltage dividers 170 in accordance with one or more exemplary embodiments of the invention. As shown in FIG. 7, each voltage divider 170 is coupled between the voltage source and one of the columns of light emitting units BL(1,1)-BL(4,4). The backlight control circuit 150 may be electrically connected to the voltage dividers 170 respectively through the signal lines SL2. Moreover, the backlight control circuit 150 may control the voltage dividers 170 to divide power supply voltage for the light emitters L depending on the statuses of the switches SW1.

Figure 8:
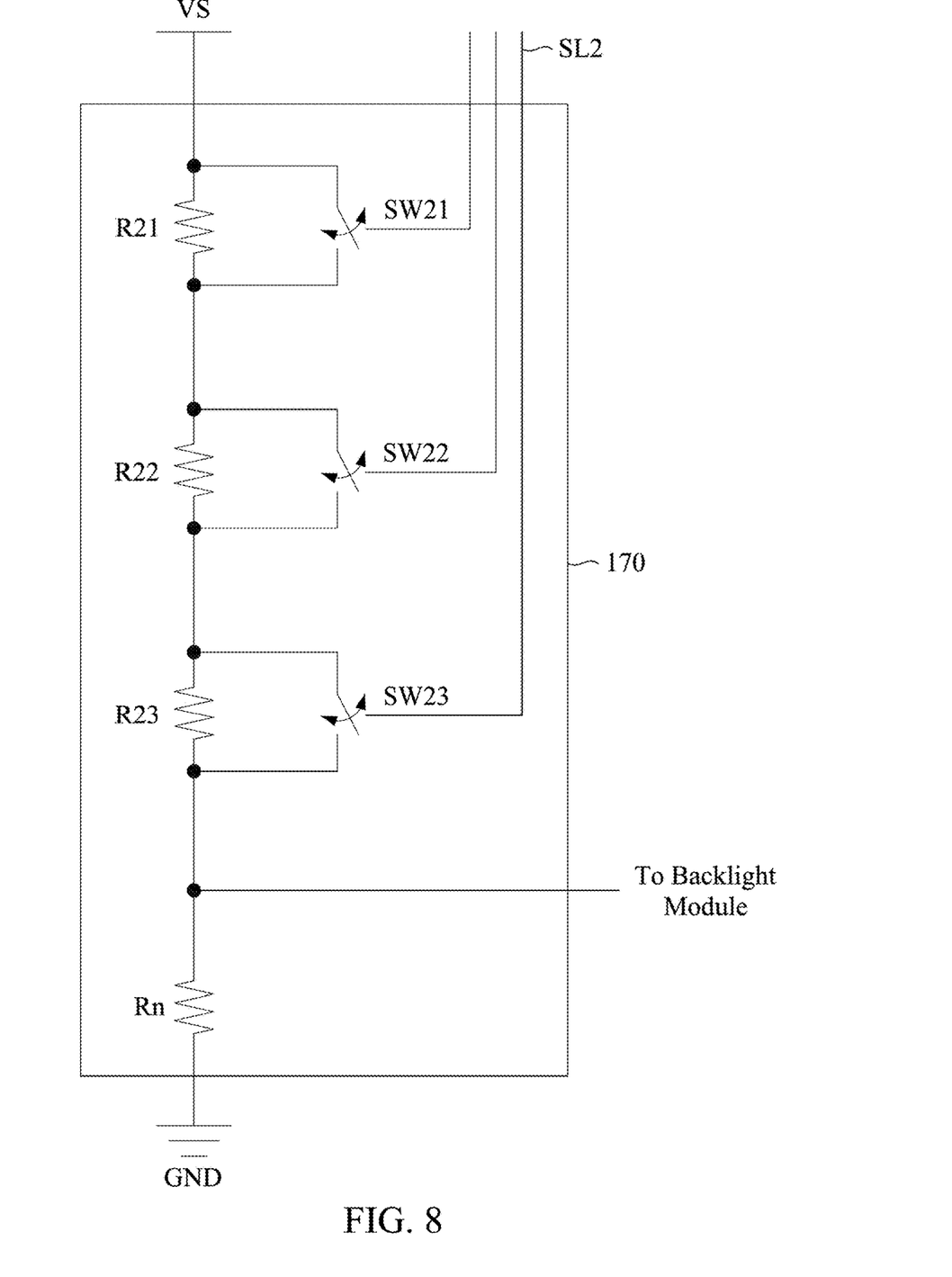
FIG. 8 is a circuit diagram of each voltage divider in FIG. 7 in accordance with one or more embodiments of the invention.

FIG. 8 is a schematic circuit diagram of each voltage divider 170 in FIG. 7 in accordance with one or more embodiments of the invention. As shown in FIG. 8, the voltage divider 170 includes voltage drop components R21-R23, switches SW21-SW23 and a resistor Rn. The voltage drop components R21-R23 are connected in series, the switches SW21-SW23 are respectively in parallel connection with the voltage drop components R21-R23 to selectively bypass the voltage drop components R21-R23, and the resistor Rn is connected between the voltage drop component R23 and the ground GND. The backlight control circuit 150 may be electrically connected to the switches SW21-SW23 of the voltage dividers 170 respectively through the signal lines SL2 to control the status of each of the switches SW21-SW23.

In various embodiments, each of the voltage drop components R21-R23 may be a resistor, a diode or another suitable component, and each of the switches SW21-SW23 may be a transistor, a thyristor or another suitable component. The resistances of the voltage drop components R21-R23 and the resistor Rn of each voltage divider 170 may be determined depending on the piezoelectric material properties of the light emitters L in the backlight module 160.

Figure 9:
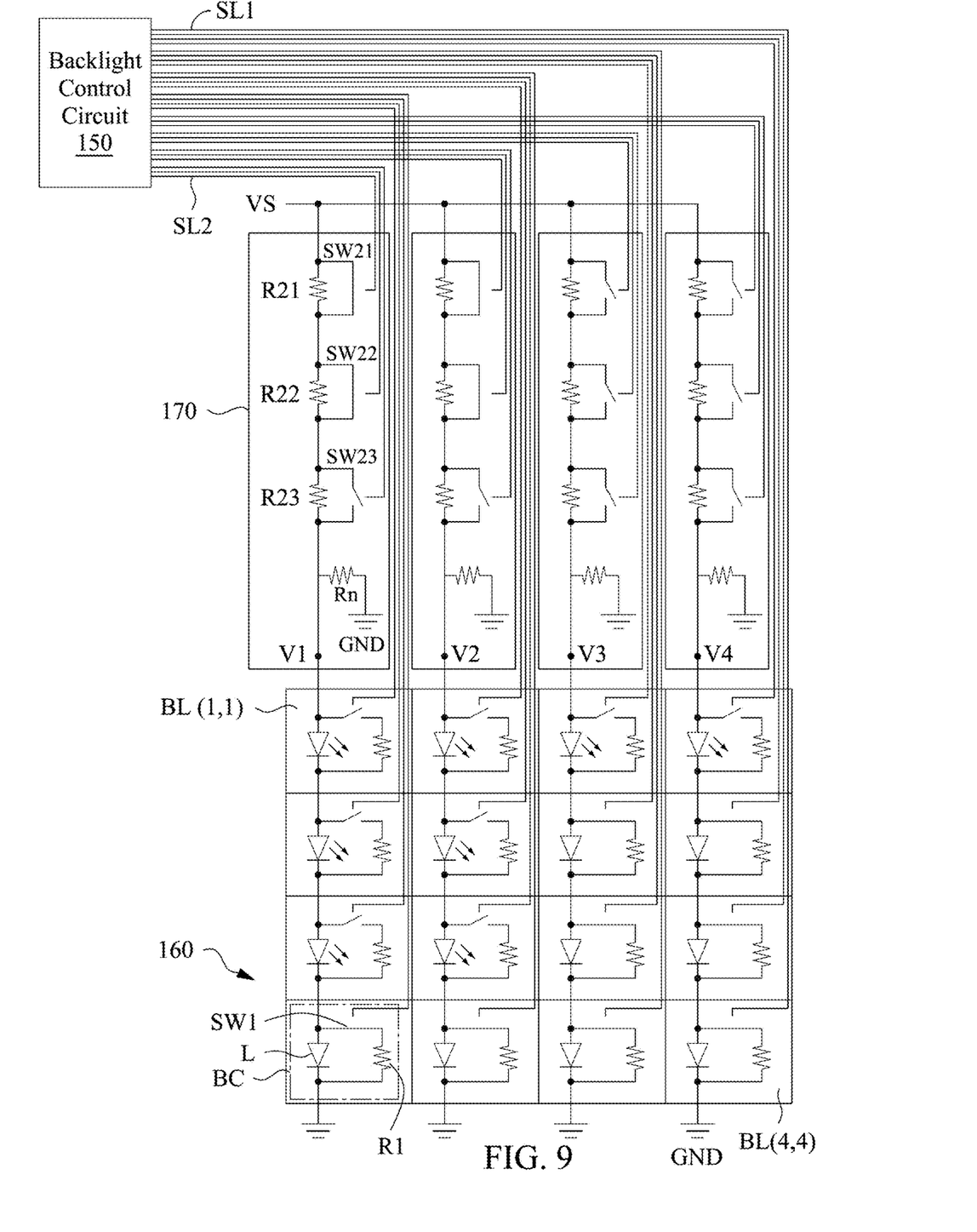
FIG. 9 exemplarily illustrates control of the switches of the light emitting units and the switches of the voltage dividers in FIG. 8 for the image shown in FIG. 5A.

FIG. 9 exemplarily illustrates control of the switches SW1 of the light emitting units BL(1,1)-BL(4,4) and the switches SW21-SW23 of the voltage dividers 170 for the image shown in FIG. 5A. The control of the emitting statuses of the light emitters L of the light emitting units BL(1,1)-BL(4,4) are similar to that described previously. Also, according to the emitting statuses of the light emitters L of the light emitting units BL(1,1)-BL(4,4) shown in FIG. 9, the backlight control circuit 150 transmits signals through the signal lines SL2 to turn on the switches SW21 and SW22 of each of the first and second voltage dividers 170 respectively connected to the first and second columns of the light emitting units BL(1,1)-BL(4,4) and turn off the switch SW23 of each of the first and second voltage dividers 170 and the switches SW21-SW23 of each of the third and fourth voltage dividers 170 respectively connected to the third and fourth columns of the light emitting units BL(1,1)-BL(4,4). Each of the voltages V1 and V2 respectively at the outputs of the first and second voltage dividers 170 is $VS \times Rn/(Rn+R23)$, while each of the voltages V3 and V4 respectively at the outputs of the third and fourth voltage dividers 170 is $VS \times Rn/(Rn+R21+R22+R23)$.

As illustrated in FIGS. 7-9, the output voltage of each voltage divider 170 may be adjusted depending on the emitting statuses of the corresponding light emitters L in the backlight module 160. In particular, the output voltage of the voltage divider 170 becomes lower as the number of the corresponding light emitters L emitting light decreases, so as to make the light emitting luminance of the light emitters L consistent.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A backlight module comprising:
   a plurality of light emitting units arranged in columns, each of the light emitting units comprising:
   a light emitter; and
   a first switch in parallel connection with the light emitter, the first switch configured to selectively bypass the light emitter;
   a control circuit electrically connected to the first switches of the light emitting units and configured to control statuses of the first switches; and
   a plurality of voltage dividers respectively connected to the columns of light emitting units and configured to divide power supply voltage for the light emitters depending on the statuses of the first switches, each voltage dividers configured to receive the power supply voltage and comprising:
   one or more first voltage drop components; and
   one or more second switches respectively in parallel connection with the one or more first voltage drop components and configured to selectively bypass the one or more first voltage drop components;
   wherein the light emitters in the same column of light emitting units are in serial connection.

2. The backlight module of claim 1, wherein each of the light emitting units further comprises a second voltage drop component in serial connection with the first switch.

3. The backlight module of claim 2, wherein the second voltage drop component of each of the light emitting units is a resistor.

4. The backlight module of claim 1, wherein the light emitter of each light emitting unit is at least one light emitting diode (LED).

5. The backlight module of claim 1, wherein the control circuit is a microcontroller.

6. The backlight module of claim 1, wherein the one or more first voltage drop components of each of the voltage dividers are one or more resistors.

7. The backlight module of claim 1, wherein the control circuit is electrically connected to the second switches of the voltage dividers and configured to control statuses of the second switches.

8. The backlight module of claim 1, wherein an output voltage of each of the voltage dividers is adjusted depending on emitting statuses of the corresponding light emitters.

9. A display apparatus comprising:
   a display panel configured to display an image based on image data;
   a backlight module configured to provide backlight for the display panel to display the image, the backlight module comprising a plurality of light emitting units arranged in columns, each of the light emitting units comprising:
   a light emitter; and
   a first switch in parallel connection with the light emitter, the first switch configured to selectively bypass the light emitter;
   a local dimming control circuit configured to generate local dimming data based on the image data and the arrangement of the light emitting units;
   a backlight control circuit configured to generate switching signals respectively for the first switches of the light emitting units based on the local dimming data; and
   a plurality of voltage dividers respectively connected to the columns of light emitting units and configured to divide power supply voltage for the light emitters depending on the statuses of the first switches, each of the voltage dividers configured to receive the power supply voltage and comprising:
   one or more first voltage drop components; and
   one or more second switches respectively in parallel connection with the one or more first voltage drop components and configured to selectively bypass the one or more first voltage drop components;
   wherein the light emitters in the same column of light emitting units are in serial connection.

10. The display apparatus of claim 9, wherein the local dimming control circuit and the backlight control circuit are integrated in a single integrated chip.

11. The display apparatus of claim 9, wherein the backlight control circuit is a microcontroller.

12. The display apparatus of claim 9, wherein the one or more first voltage drop components of each of the voltage dividers are one or more resistors.

13. The display apparatus of claim 9, wherein the backlight control circuit is electrically connected to the second switches of the voltage dividers and configured to control statuses of the second switches.

14. The display apparatus of claim 9, wherein each of the light emitting units further comprises a second voltage drop component in serial connection with the first switch.

15. The display apparatus of claim 14, wherein the second voltage drop component of each of the light emitting units is a resistor.

16. The display apparatus of claim 9, wherein an output voltage of each of the voltage dividers is adjusted depending on emitting statuses of the corresponding light emitters.

* * * * *